（12） United States Patent
Iida et al.

(10) Patent No.: US 9,016,797 B2
(45) Date of Patent: Apr. 28, 2015

(54) SEAT DEVICE FOR USE IN A VEHICLE

(75) Inventors: Fujio Iida, Shimotsuke (JP); Masami Sasaki, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 512 days.

(21) Appl. No.: 13/355,355

(22) Filed: Jan. 20, 2012

(65) Prior Publication Data

US 2012/0261955 A1 Oct. 18, 2012

(30) Foreign Application Priority Data

Jan. 21, 2011 (JP) ................................. 2011-011142

(51) Int. Cl.
| A47D 15/00 | (2006.01) |
| B60N 2/24 | (2006.01) |
| B60N 2/02 | (2006.01) |
| B60N 2/06 | (2006.01) |
| B60N 2/07 | (2006.01) |
| B60N 2/14 | (2006.01) |
| B60N 2/46 | (2006.01) |
| A61G 3/02 | (2006.01) |
| A61G 5/08 | (2006.01) |
| B60N 2/44 | (2006.01) |

(52) U.S. Cl.
CPC .............. *B60N 2/245* (2013.01); *B60N 2/0252* (2013.01); *B60N 2/067* (2013.01); *B60N 2/0742* (2013.01); *B60N 2/0745* (2013.01); *B60N 2/14* (2013.01); *B60N 2/4606* (2013.01); *B60N 2/4633* (2013.01); *B60N 2/468* (2013.01); *A61G 3/0209* (2013.01); *A61G 2005/0816* (2013.01); *B60N 2002/4405* (2013.01)

(58) Field of Classification Search
CPC .......... B60N 2/00; B60N 2/245; B60N 2/468; B60N 2/4686; B60R 7/043
USPC ...................... 297/468, 423.2, 344.1, 344.24; 296/65.11, 65.12, 65.15; 280/801.1, 280/250.1
See application file for complete search history.

(56) References Cited

U.S. PATENT DOCUMENTS 4,170,368 A * 10/1979 Southward et al. ........ 280/250.1
4,479,752 A * 10/1984 Todd .............................. 414/462
4,565,482 A *  1/1986 Baker ........................... 414/462

(Continued)

FOREIGN PATENT DOCUMENTS

JP 2002-306539 10/2002

OTHER PUBLICATIONS

Translated abstract of JP 2002-306539 (see above) from "Patent Abstracts of Japan"; available through http://www.ipdl.inpit.go.jp/homepg_e.ipdl, "PAJ"; accessed on Jan. 19, 2012.

*Primary Examiner* — Laurie Cranmer
(74) *Attorney, Agent, or Firm* — Honda Patents & Technologies North America, LLC; Joseph Juliano

(57) ABSTRACT

A seat device for use in a vehicle that can move through an opening of a vehicle between a loading and unloading position positioned outside the vehicle, where a passenger can load and unload as well as be seated, and a seating position positioned in the cabin of the vehicle, where the passenger can maintain a seated disposition. A securing member of the seat device can secure a wheelchair in a folded state to a side surface or a back surface of the seat. The wheelchair together with the seat can move from the loading and unloading position to inside the cabin of the vehicle, with the passenger in a seated position.

20 Claims, 15 Drawing Sheets

(56) References Cited

U.S. PATENT DOCUMENTS

| | | | | |
|---|---|---|---|---|
| 5,096,361 A | * | 3/1992 | Crawford | 414/462 |
| 5,308,214 A | * | 5/1994 | Crain et al. | 414/541 |
| 5,746,563 A | * | 5/1998 | Steckler | 414/462 |
| 6,830,423 B1 | * | 12/2004 | Williams et al. | 414/462 |
| 6,962,383 B2 | * | 11/2005 | Takenoshita et al. | 296/65.03 |
| 7,296,960 B2 | * | 11/2007 | Strong | 414/546 |
| 7,316,441 B2 | * | 1/2008 | Iwatani et al. | 296/65.12 |
| 7,402,019 B2 | * | 7/2008 | Alexander | 414/462 |
| 7,404,505 B2 | * | 7/2008 | Walther | 224/566 |
| 7,967,336 B2 | * | 6/2011 | Biseli | 280/769 |

* cited by examiner

SEAT DEVICE FOR USE IN A VEHICLE

CROSS REFERENCE TO RELATED APPLICATIONS

The present application claims priority under 35 U.S.C. §119 to Japanese Patent Application No. 2011-011142, filed Jan. 21, 2011, entitled "SEAT DEVICE FOR USE IN VEHICLE", the contents of which are incorporated herein by reference in their entirety.

BACKGROUND

The present application relates to a seat device for use in a vehicle that enables a person sitting in a wheelchair to get in and out of a vehicle and also relates to loading a wheelchair into a vehicle.

Technology for enabling a person sitting in a wheelchair to get in and out of a vehicle can be broadly categorized into the following two categories of technology. The first technology uses the wheelchair as is for the vehicle seat. In other words, the seat of the vehicle is also used as the wheelchair. With this first technology, a person sitting in a wheelchair can get into a vehicle together with the wheelchair as is. However, it is better for the wheelchair user to be able to select a wheelchair that is the best for them. When the vehicle seat is used as the wheelchair, there are restrictions in selecting the optimal wheelchair.

The second technology is what could be called a "separately placed wheelchair method" where the person sitting in the wheelchair transitions to a vehicle seat, after which the wheelchair is loaded into the vehicle. With this second technology, the range is broadened for the wheelchair user to select the wheelchair that is best for them. Technology such as this second technology is well known (see for example Japanese Unexamined Patent Application Publication No. 2002-306539 (FIG. 1)).

The seat device for use in a vehicle may be provided with a loading part equipped on the vehicle for loading the wheelchair, a transfer mechanism for moving the wheelchair to the prescribed loading part after the person sitting in the wheelchair has transitioned over to the seat, and an operation switch equipped on the vehicle for operating the transfer mechanism. When the person sitting in the wheelchair (passenger) transitions over to the vehicle, the seat is moved from the cabin of the vehicle through the door opening to the loading and unloading position outside the vehicle. The passenger having thus transitioned over from the wheelchair to the seat moves the transfer mechanism over the wheelchair, which has been folded, and attaches the wheelchair to the transfer mechanism. Next, the wheelchair is loaded into a prescribed position of the vehicle by operating the transfer mechanism to lower the wheelchair into the loading part. Meanwhile, the passenger can get into the vehicle by returning the seat where the passenger is sitting to the cabin of the vehicle from the loading and unloading position.

SUMMARY

Because a seat device for use in a vehicle in one disclosure along the lines of the second technology referenced above involves a separately placed wheelchair, a required length of time to load the wheelchair to a prescribed position of the vehicle may be time consuming, as time is required to return the seat to the cabin of the vehicle from the loading and unloading position in addition to time spent loading a wheelchair. Further, because a device that mounts a wheelchair in a folded state and the seat where the passenger sits are provided in separate respective positions in the vehicle, a device may become quite large, consuming space in the vehicle cabin and getting in the way.

It might be desirable to provide a technology that may shorten the time for loading a wheelchair into a vehicle and may shorten the time for returning a seat to the cabin and, furthermore, that may reduce the size of a device that mounts a wheelchair.

A first aspect of the present disclosure is a seat device for use in a vehicle that can move through an opening of a vehicle, comprising moving a seat between a loading and unloading position positioned outside the vehicle, where a passenger can load and unload as well as be seated, and a seating position positioned in a cabin of the vehicle, where the passenger can maintain a seated disposition; wherein a securing member that can secure a wheelchair in a folded state to a side surface or a back surface of the seat is provided on the seat, as a configuration whereby the wheelchair together with the seat can move from the loading and unloading position to the cabin of the vehicle, with the passenger in a seated position.

Because a securing member may move together with a seat of a vehicle, the wheelchair and the seat with the passenger in a seated state may be moved at one time from the loading and unloading position to a cabin of the vehicle, and thereby the time to load the wheelchair and time to return the seat may be shortened. In addition, because a wheelchair in a folded state may be brought into the cabin from the opening of the vehicle, the wheelchair might not be in the way of a passenger or driver, which may enable space within the cabin of the vehicle to be used more effectively.

In another aspect of the present disclosure, a seat may be provided with a raising and lowering mechanism that can raise and lower, in relation to the seat, the wheelchair secured by the securing member.

In the loading and unloading position, the wheels of the wheelchair are positioned in a lower position than the seat. In this state, moving the wheelchair into the cabin may be difficult. Therefore, in this aspect, because the wheelchair is raised by the raising and lowering mechanism, the wheelchair can be moved to a height that enables passage through the opening of the vehicle. Therefore, the wheelchair can be easily moved into the cabin, and moreover, the time to load the wheelchair and the time to return the seat can be shortened.

In yet another aspect of the present disclosure, the raising and lowering mechanism may be configured by an armrest that can swing up and down, provided on a side part of the seat. Because the armrest can also serves as the raising and lowering mechanism, securing additional space for the raising and lowering mechanism is not necessary and the size of the device for loading the wheelchair can be reduced.

Yet another aspect of the present disclosure may include, in the configuration that secures the wheelchair to the back surface, a displacement mechanism for moving the securing member between a side surface position, where the wheelchair in the folded state is arranged on the side surface of the seat, and a back surface securing position, where the wheelchair from the side surface position is secured to the back surface of the seat.

The wheelchair may be secured to the back surface of the seat when moving the seat between the loading and unloading position and the seating position. When securing the wheelchair in this manner, the size of the space in the seat width direction may be suppressed from expanding compared to when the wheelchair is secured to the side surface of the seat. Therefore, the seat having the wheelchair secured thereto can be more easily moved into and out of the cabin from an opening of the vehicle. Further, once the seat is set in the seating position, the wheelchair can be moved from the back to the side surface position to enable the space behind the seat to be sufficiently utilized.

In yet another aspect of the present disclosure, the securing member may be configured by a belt shaped member that can roll up in an inner part of the seat. Because the securing member can be rolled up within the seat when the wheelchair is not in use, the securing member might not be in the way of a passenger or driver.

In another aspect, a seat device may include a securing member to secure a wheelchair in a folded state to a side surface or a back surface of a vehicle seat such that the wheelchair together with the vehicle seat can move from a loading and unloading position to a cabin of a vehicle with a passenger in a seated position.

In another aspect, a method includes positioning a vehicle seat outside of a vehicle associated with the vehicle seat, connecting a wheelchair to the vehicle seat using a securing device of the vehicle seat, and positioning the vehicle seat to a seating position for a passenger, where the seating position is a position for movement of a passenger along with the vehicle while the vehicle is in motion and where the positioning involves the device moving the wheelchair with the vehicle chair and the positioning results in the wheelchair being stowed in the vehicle cabin. The method may be performed by a combination of a passenger, vehicle mechanical structures, and vehicle electronics (e.g., hardware and/or software). For example, a passenger may manually move a seat outside a vehicle, manually secure a wheelchair, and then manually move the seat back into the vehicle for another passenger. As another example, vehicle electronics may cause a vehicle's mechanical structures to move a vehicle seat outside the vehicle, then the vehicle seat may secure itself to a wheelchair, and the vehicle seat may position itself back in the cabin.

In variations, a loading and unloading position outside a vehicle is a position where the passenger can load and unload as well as be seated, and the seated position is a position where the passenger can maintain a seated disposition. The vehicle seat may include a raising and lowering mechanism that can raise and lower, in relation to the vehicle seat, the wheelchair secured by the securing member. A raising and lowering mechanism may include an armrest that can swing up and down, provided on a side part of the vehicle seat. A seat device may include a displacement mechanism to move a securing member between a side surface position, where the wheelchair in the folded state is arranged on the side surface of the vehicle seat, and a back surface securing position, where the wheelchair from the side surface position is secured to the back surface of the vehicle seat. A securing member may include a belt shaped member that can roll up in an inner part of the vehicle seat. A seat device may include a driver's seat for an automobile. A securing member may include a belt with a ratchet to regulate a belt reel.

DETAILED DESCRIPTION

The following will describe, with reference to the attached drawings, seat devices for use in a vehicle that enables a person sitting in a wheelchair to get in and out of a vehicle and loading a wheelchair into a vehicle.

Figure 1:
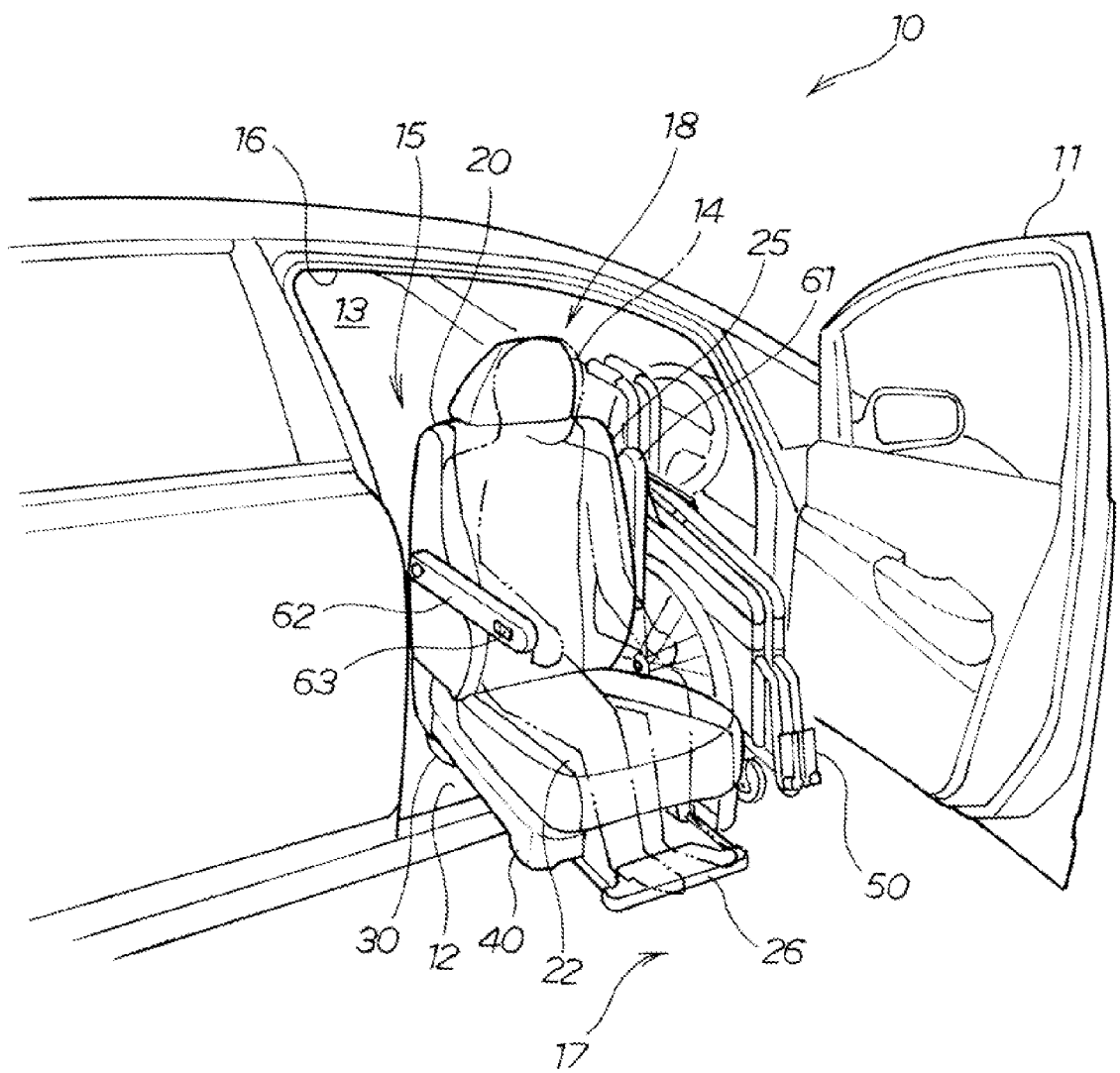
FIG. 1 is a drawing for explaining a state of use of the seat device for use in a vehicle according to one embodiment.

First, a description will be given of a first embodiment based on FIGS. 1 to 13. FIG. 1 illustrates the state in which a door 11 is open on the driver side of a vehicle 10, which is a vehicle with the steering wheel on the right side. A seat device 18 for use in a vehicle illustrated in FIG. 1 is arranged on a floor 12 of the vehicle 10 with a rotation mechanism 30 and a transfer mechanism 40 there between.

With the seat device 18 for use in a vehicle, a seat 20 rotates outward of the vehicle 10 by the rotation mechanism 30 which is positioned in a cabin 13 at a seating position 15 such that a passenger 14 can maintain a seated disposition. As shown in FIG. 1, this seat 20 can move to a loading and unloading position 17 where the passenger 14 can load and unload and also be seated, which is positioned outside of the vehicle by the transfer mechanism 40 from an opening 16 of the vehicle 10 (for example, a door opening formed in the side surface of the vehicle 10).

When a passenger 14 gets into the vehicle 10, the seat 20 moves through the opening 16 of the vehicle 10 from the loading and unloading position 17 to the seating position 15 (seat 20 not shown in seating position 15 in FIG. 1). When the seat 20 moves, the wheelchair 50 may be in a folded state and secured to a side surface 25 of the seat 20. Note, while embodiments of a seat device, such as the seat device 18, for use in a vehicle may be arranged on the driver side of a vehicle, the subject matter disclosed is not limited as such and seat devices can be positioned on the passenger side or on the back seat side (e.g., seat device 18 may include a vehicle seat that is a rear bucket seat in a vehicle).

The seat device 18 includes armrests 61 and 62, a foot rest step 26, and a seat bottom part 22. One armrest 61 may function as a raising and lowering mechanism for the wheelchair 50 while the other armrest 62 may include a switch 63 for operating the seat device 18.

Figure 2:
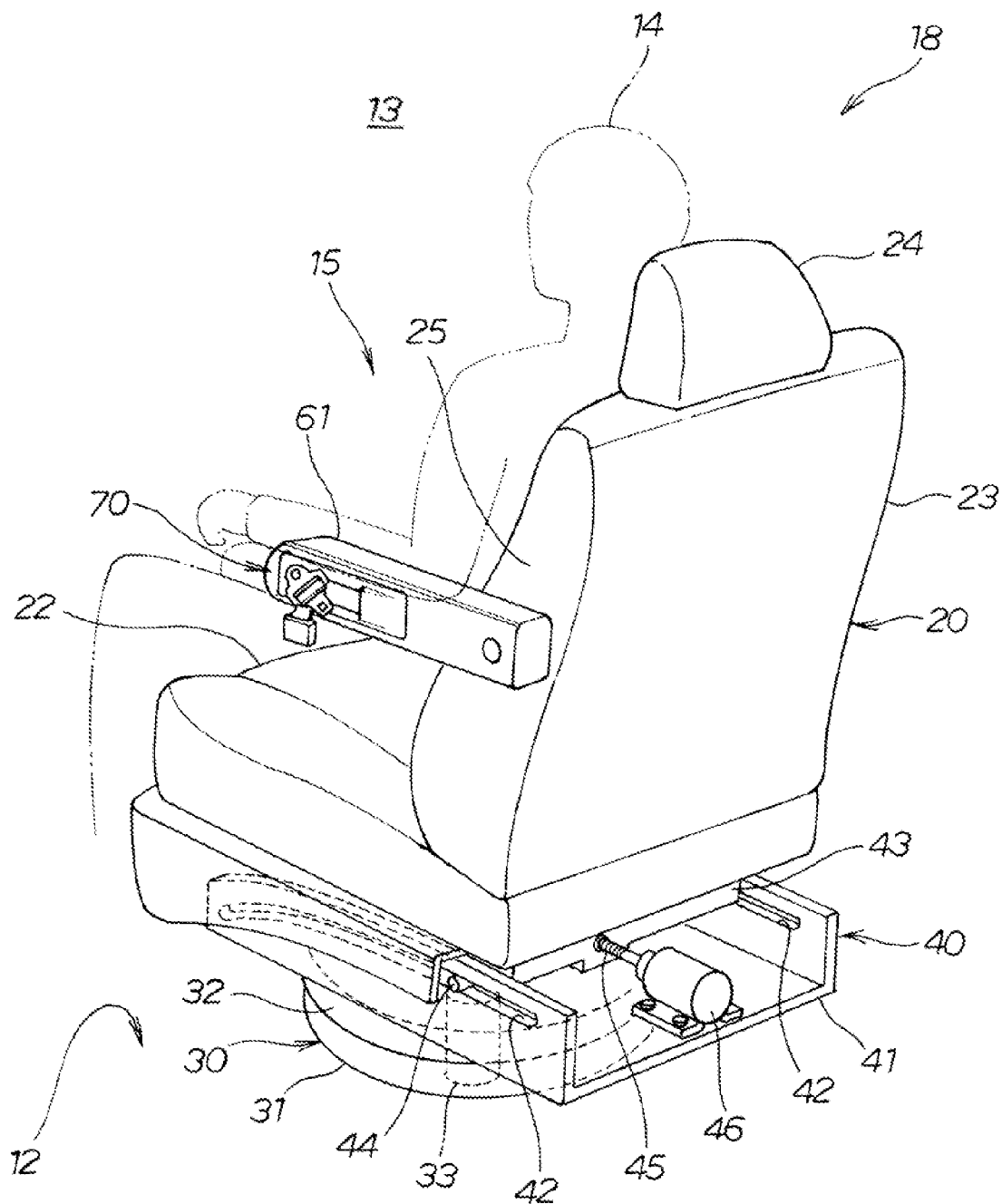
FIG. 2 is a drawing for explaining a transfer mechanism and a rotation mechanism of the seat device for use in a vehicle illustrated in FIG. 1.

As illustrated in FIG. 2, the seat device 18 for use in a vehicle includes the rotation mechanism 30 provided on the floor 12 in the vehicle, the transfer mechanism 40 provided above the rotation mechanism 30, and the seat 20 provided above the transfer mechanism 40.

The rotation mechanism 30 can rotate the seat 20 in the left and right directions with the transfer mechanism 40 there between. The rotation mechanism 30 includes a base part 31 provided on the floor 12, a rotation support plate 32 that supports the transfer mechanism 40 provided to freely rotate on the base part 31, and a rotary motor 33 to rotate the rotation support plate 32 provided on the base part 31.

The transfer mechanism 40 can advance and retract the seat 20 in relation to the rotation mechanism 30. The transfer mechanism 40 includes a base member 41 provided on the rotation support plate 32 that extends to the front and rear direction in the shape of a C, guide grooves 42 provided on the base member 41 and shaped so as to slope downward toward the front of the seat device 18 (as illustrated), a transfer support plate 43 provided on the base member 41 to freely move front and back that supports the seat 20, a guide pin 44 provided on the transfer support plate 43 to move along the guide grooves 42, and a transfer motor 46 secured to the base member 41 to move the transfer support plate 43 through a ball screw 45.

The seat 20 of FIG. 2 includes a seat part 22 provided on the transfer support plate 43, a backrest part 23 provided on the end part of the seat part 22, a headrest 24 provided on the top end of the backrest part 23, and left armrest 61 provided on the left side surface 25 of the backrest part 23. The left armrest 61 includes a securing unit 70.

Figure 3:
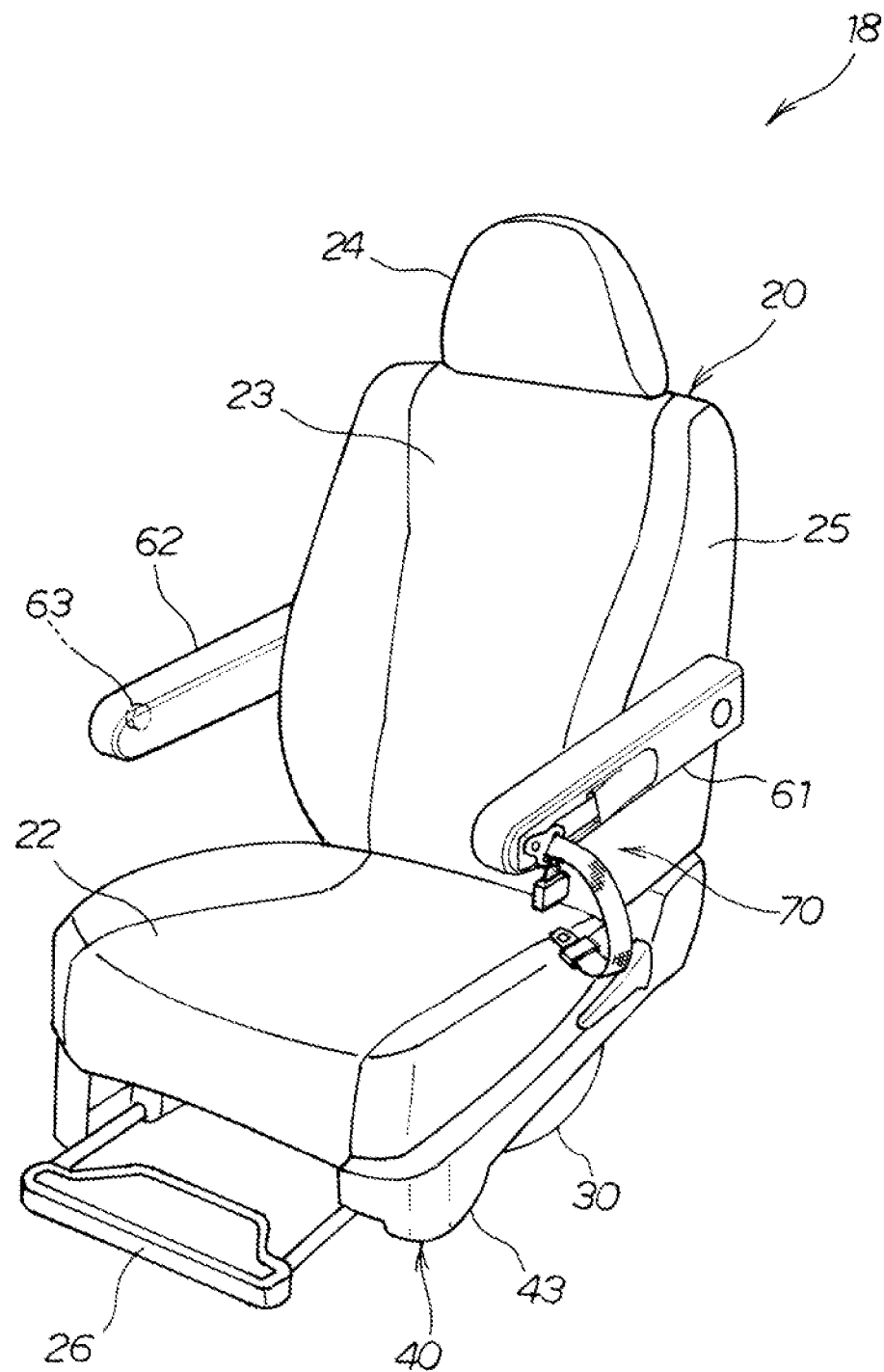
FIG. 3 is a drawing of the seat device for use in a vehicle illustrated in FIG. 2 as viewed from the front.
Figure 4:
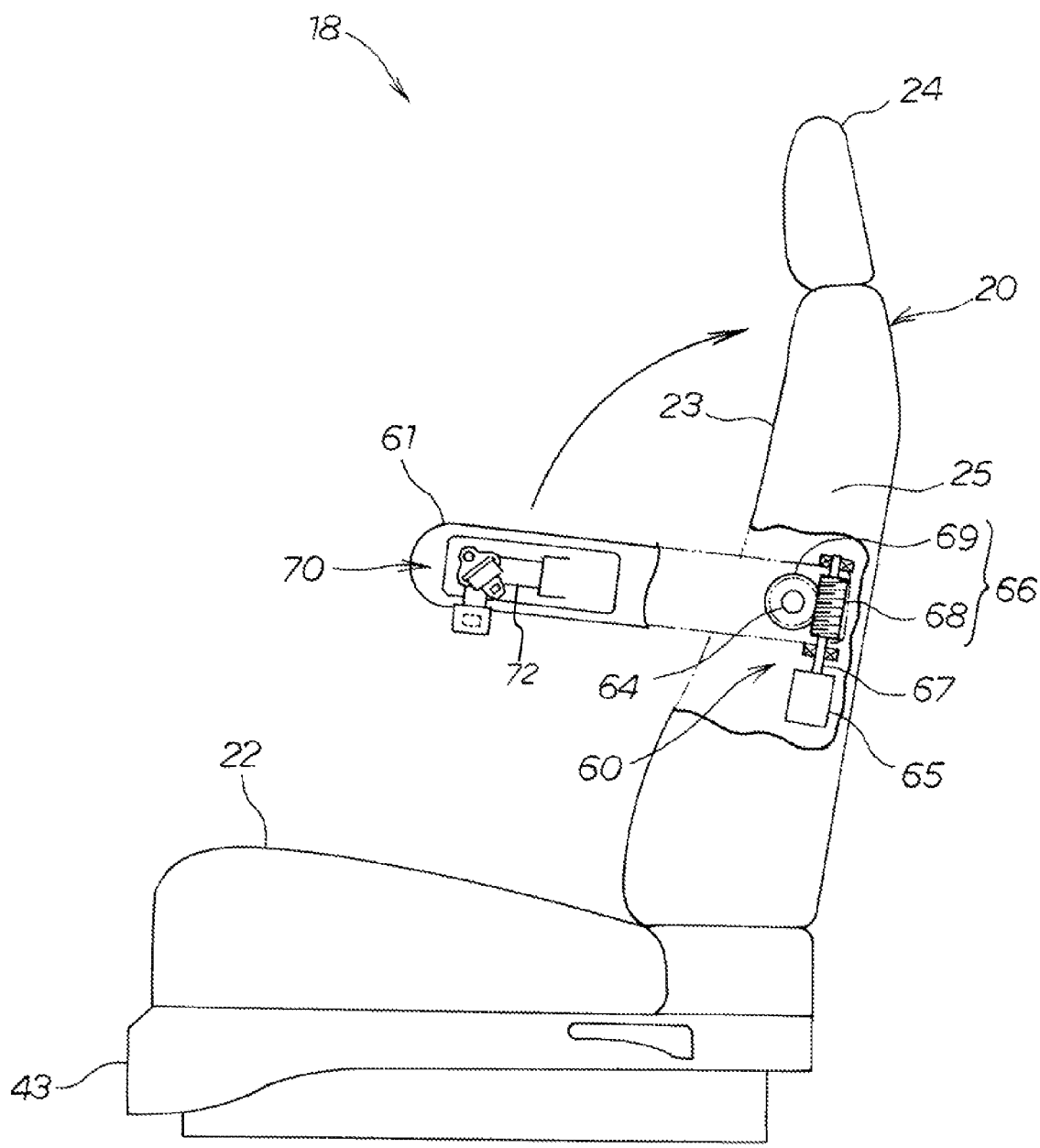
FIG. 4 is a drawing for explaining a raising and lowering mechanism illustrated in FIG. 3.

FIG. 3 and FIG. 4 also illustrate the seat device 18. As illustrated in FIG. 3 and FIG. 4, the seat 20 includes a seat part 22 provided on the transfer support plate 43, a backrest part 23 provided on the end part of the seat part 22, a headrest 24 provided on the top end of the backrest part 23, left armrest 61 provided on the left side surface 25 of the backrest part 23. FIG. 3 additionally shows a right armrest 62 on the right side surface 25 of the backrest part 23 and a foot rest step 26 provided below the seat part 22.

The left and right armrests 61 and 62 are provided on the side parts of the backrest part 23 so as to be able to swing up and down between a use position, which is illustrated in the drawing as a substantially horizontal state to rest the elbows of the passenger, and a nonuse position (not illustrated) in an upright state along the side surfaces 25 of the backrest part 23. In addition, either of the left or right armrests 61 or 62 is provided with a securing unit 70, for example in the left armrest 61. As shown in FIG. 3 a switch 63 is provided on the tip of the right armrest 62, which is the one that does not have the securing unit 70. The switch 63 is for manually operating the rotation mechanism 30, transfer mechanism 40, the raising and lowering mechanism of the armrest 61 to be described later, and the securing unit 70.

Figure 5:
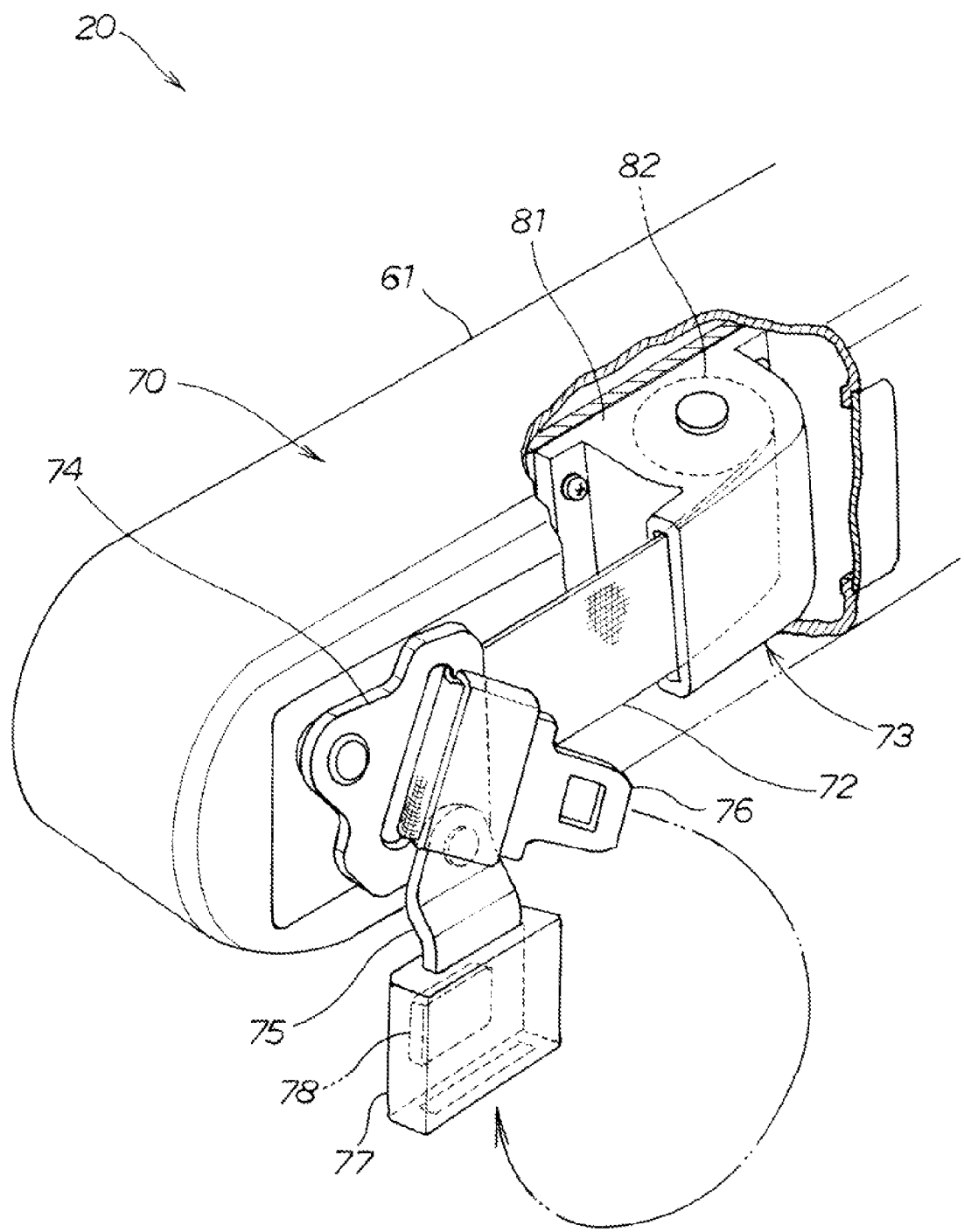
FIG. 5 is a perspective view of a securing unit illustrated in FIG. 4.

The securing unit 70 may secure a folded wheelchair to the side surface of the seat 20 (the side surface 25 of the backrest part 23). In FIG. 1, the wheelchair 50 is shown secured to the side surface 25 of the seat 20 by a securing mechanism of the armrest 61. As illustrated in FIG. 5, the securing unit 70 of seat 20 includes a belt 72, a retractor 73, a first anchor 74, a second anchor 75, a tongue 76, and a buckle 77.

The belt 72 is a securing member to secure a folded wheelchair to the side surface of the seat 20 (e.g., a wheelchair 50 to the side surface 25 of the seat 20 as shown in FIG. 1) and is configured by a belt shaped member having flexibility and the ability to roll up within the seat 20. The tongue 76 is provided on the tip end of the belt 72. The buckle 77 in which the tongue 76 can be attached and removed by a one-touch operation is provided on the second anchor 75. The buckle 77 is provided with a lock release button 78. Pressing the release button 78 enables the locked state of the tongue 76 relative to the buckle 77 to be released. Hereinafter, the belt 72 may be referred to as the "securing member 72."

The retractor 73 is provided within the armrest 61 and is a belt roll up device to roll up the belt 72 into the armrest 61. The retractor 73 has a similar configuration to, for example, the retractor of a seat belt device for use in a vehicle, and includes a case part 81 that is attached within the armrest 61, a belt reel 82 provided within the case part 81 for rolling up the belt 72, a spring (not illustrated) biased in the belt roll up direction of the belt reel 82, and a ratchet mechanism (not illustrated) to regulate the belt reel 82 rotation in the belt draw out direction.

The ratchet mechanism acts to allow the belt reel 82 to rotate in the belt draw out direction when the belt 72 is slowly pulled from the belt reel 82 (in the case of a normal draw out operation). However, the ratchet mechanism acts to prevent the belt reel 82 from rotating in the belt draw out direction when the belt 72 is quickly drawn out from the belt reel 82 (in the case of a rapid draw out operation) and when the weight of a wheelchair, such as the wheelchair 50 of FIG. 1, acts on the belt 72 (when a large load is applied).

The belt 72 is pulled out from the retractor 73, and the proportion that is exposed outside from the left armrest 61 is guided by the first anchor 74 and supported by the second anchor 75. The first anchor 74 is a through-anchor to securely guide the externally exposed belt 72 to inside the armrest 61. This first anchor 74 is positioned on the tip end part of the left armrest 61 and is attached so as to be able to swing up and down on the outside surface in the seat width direction. The second anchor 75 is an anchor to support the externally exposed belt 72 on the armrest 61 and is attached so as to be able to swing up and down at the end part of the first anchor 74.

When the tongue 76 is in a detached state from the buckle 77, that is to say when the belt 72 is in a nonuse state, the belt is automatically rolled up by the retractor 73 and stored within the armrest 61. In this state, the tongue 76 is hooked on the anchor 74 so that only the tip end of the belt 72 is externally exposed from the armrest 61 as illustrated in FIG. 5.

Note, with the first embodiment, the mechanism to secure a wheelchair was the configuration of the securing unit 70 described above, but the mechanism is not limited as such. For example, alternative configurations may also be used where the wheelchair 50 can be secured to the armrest 61 and the belt shaped member 72 can be rolled up into the seat 20.

The left armrest 61, in which the securing unit 70 is provided, is supported and driven so as to be able to swing up and down by a swing mechanism 60 as illustrated in FIG. 4. While FIG. 4 shows the left armrest 61 in the down position (or use position; insofar as a passenger is able to effectively use the armrest as an armrest), FIG. 1 shows the left armrest 61 in the up position (or nonuse position; insofar as a passenger is not able to effectively use the armrest as an armrest). Returning to FIG. 4, the swing mechanism 60 includes a support shaft 64 that supports the swing base end part of the left armrest 61 so as to be able to swing up and down on the side surface 25 of the backrest part 23, a motor 65 that outputs driving force to drive the swing of the left armrest 61, and a worm gear mechanism 66 that transfers the driving force of the motor 65 to the left armrest 61. The worm gear mechanism 66 includes a worm 68 connected to a motor shaft 67 of the motor 65, and a worm wheel 69 that meshes with the worm 68. The worm wheel 69 is secured to the left armrest 61 so as to be able to rotate centrally around the support shaft 64.

The driving force of the motor 65 is transferred to the left armrest 61 via the worm gear mechanism 66. The left armrest 61 moves to swing up and down from a use position to a nonuse position according to the normal rotation and reverse rotation of the motor 65. For example, when the motor 65 moves in a normal rotation so that the left armrest 61 swings from a use position (the position illustrated in FIG. 4) to a nonuse position as indicated by the arrow, a wheelchair, which is secured to the left armrest 61 by the belt 72, rises. When in this raised state, a wheelchair together with the left armrest 61 is lowered by the reverse rotation of the motor 65.

In this manner, the left armrest 61 can function as a raising and lowering mechanism so as to be able to raise and lower a wheelchair that is secured to the seat 20 by the belt 72 (securing member 72) in relation to the seat 20. The left armrest 61 may hereinafter be referred to as the "raising and lowering mechanism 61".

Figure 7:
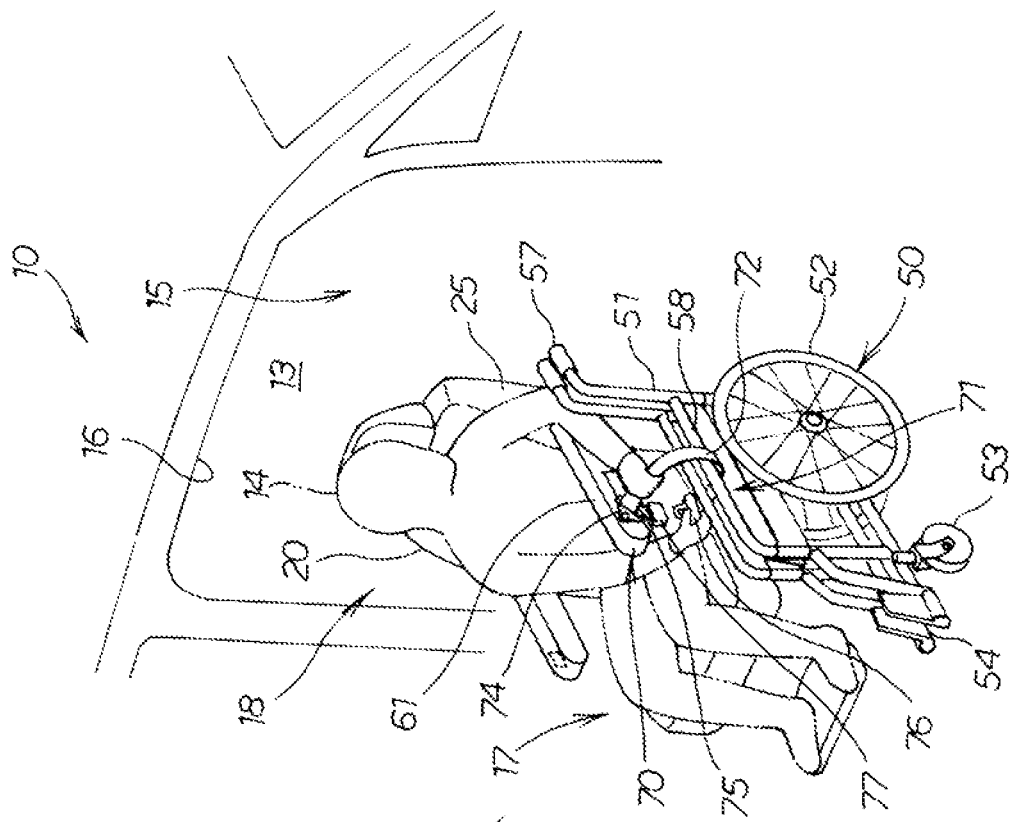
FIGS. 6-7 are drawings for explaining a procedure for securing a wheelchair to the side part of the seat illustrated in FIG. 3.
Figure 6:
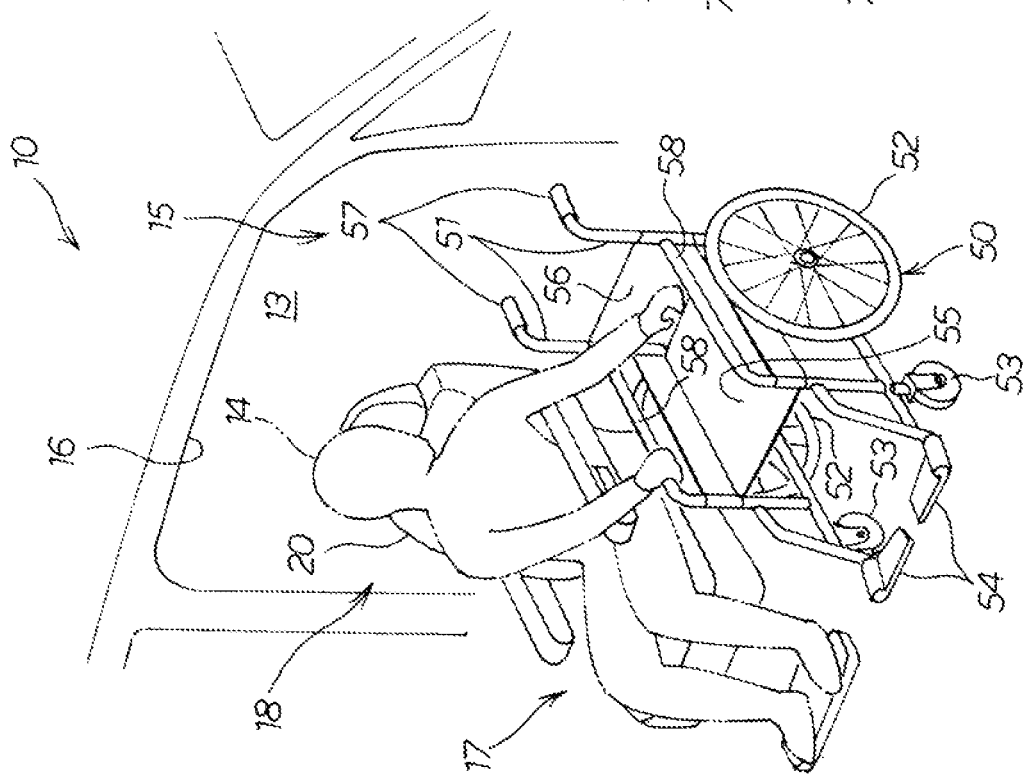

As illustrated in FIGS. 6-7, the wheelchair 50 is not a specialized wheelchair that can only be loaded into a specific type of vehicle but is a general wheelchair 50 that can be folded. Wheelchair 50 is a model that can be folded in the width direction and includes a frame part 51 which is a base, left and right rear wheels 52 that can be turned by hand, left and right front wheels 53 (casters) that can swivel, a foot rest part 54 where the feet of the passenger 14 can be placed, a seat surface 55 (shown in FIG. 6 but not FIG. 7, where seat surface 55 is collapsed) where the passenger 14 can sit and that can be folded, a backrest 56 (shown in FIG. 6 but not FIG. 7, where back rest 56 is collapsed) which the passenger 14 can lean back against and that can be folded, operation handles 57 to be used when the wheelchair 50 is pushed, and left and right armrest parts 58 integrally provided with the frame part 51. As shown in FIG. 7, the left armrest 61 includes a securing unit 70 and this type of wheelchair 50 can be secured to the left armrest 61 by passing the belt 72 through the lower part of the left and right armrest parts 58 after folding.

Further, as described above, the first and second anchors 74 and 75 of the securing unit 70 have a configuration that allows these to swing up and down in relation to the armrest 61. Even if the armrest 61 to which the wheelchair 50 is secured by the belt 72 were to move by swinging up and down between the use position and the nonuse position, the first and second anchors 74 and 75 will always face downward. The belt 72 is not twisted when securing the wheelchair 50 to the armrest 61 and can always continue to properly secure the wheelchair 50.

Note, the wheelchair 50 is not limited to the configuration described above. For example, alternate configurations may be possible where the wheelchair can be folded and can be suspended by a belt shaped member such as a belt.

Next with reference to FIGS. 6 and 7, a description will be given of the procedure for the passenger 14 sitting in the wheelchair 50 to get into the vehicle 10. FIGS. 6 and 7 include the seat device 18 in a position outside of a cabin 13 of vehicle 10. To get to this position, the seat device 18 has moved through opening 16. FIG. 6 illustrates a state in which the seat 20 is moved from the seating position 15 to the loading and unloading position 17. The seat 20 positioned in a prescribed loading and unloading position 17 is facing outside in the vehicle width direction in relation to the vehicle 10. The passenger 14 sitting in the wheelchair 50, when getting into the vehicle 10, first, may align the wheelchair 50 next to the seat 20 and transitions from the wheelchair 50 to the seat 20. After the passenger 14 has transitioned to the seat 20, the wheelchair 50 is folded up.

FIG. 7 illustrates a state in which the passenger 14, having transitioned to the seat 20 from the seating position 15 to the loading and unloading position 17, has completed folding the wheelchair 50. Next, the passenger 14 pulls out the belt 72 of the securing unit 70 from the left armrest 61 and passes the belt 72 through the lower part 71 of the armrest part 58 of the wheelchair 50 and locks it by inserting the tongue 76 into the buckle 77. As a result, the wheelchair 50 is secured to the left armrest 61 by the belt 72. In other words, the wheelchair 50 in a folded state is secured to the side surface of the seat 20 (the side surface 25) by the belt 72.

Figure 8:
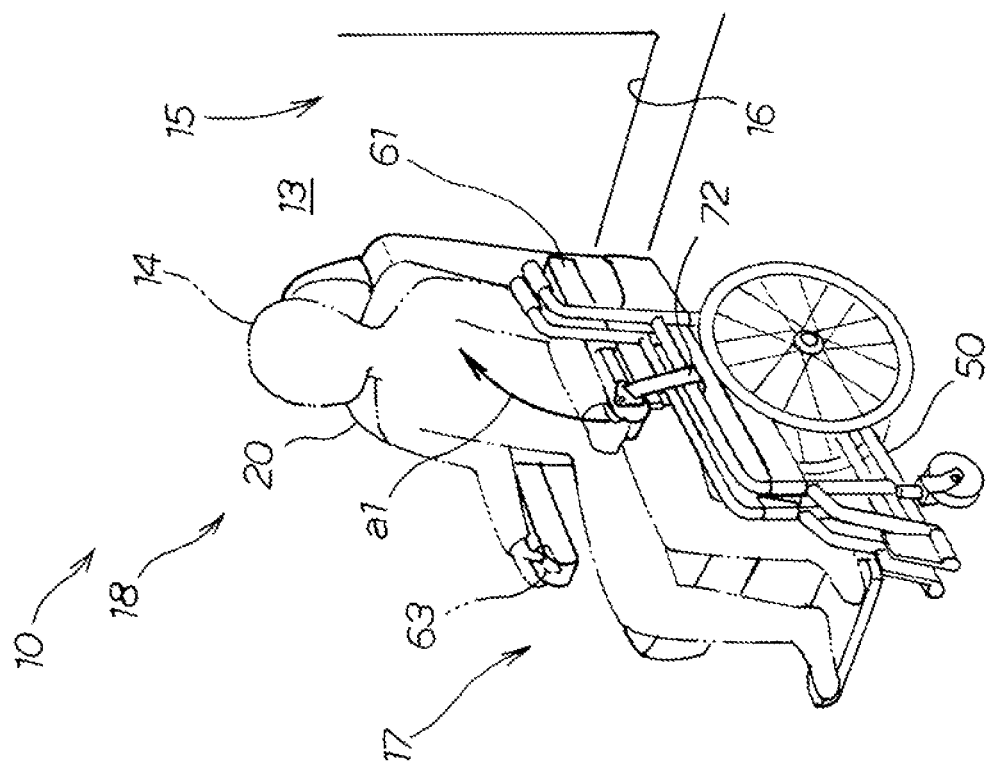

FIG. 8 also illustrates the seat device 18 as part of the process of moving the seat 20 from the loading and unloading position 17 to the seating position 15 in the cabin 13 of the vehicle 10. FIG. 8 illustrates a state in which the wheelchair 50 is secured to the left armrest 61 by the belt 72. Following the state of FIG. 7, in FIG. 8 the passenger 14 may operate the switch 63 to make the motor (see motor 65 of FIG. 4) undertake a normal rotation. As a result of this rotation, the left armrest 61 performs a swing movement upward as illustrated by the arrow a1 in accordance with the normal rotation of the motor. As result, the wheelchair 50, which is secured to the left armrest 61, is raised up higher than the bottom edge of the opening 16 of the vehicle 10.

Figure 9:
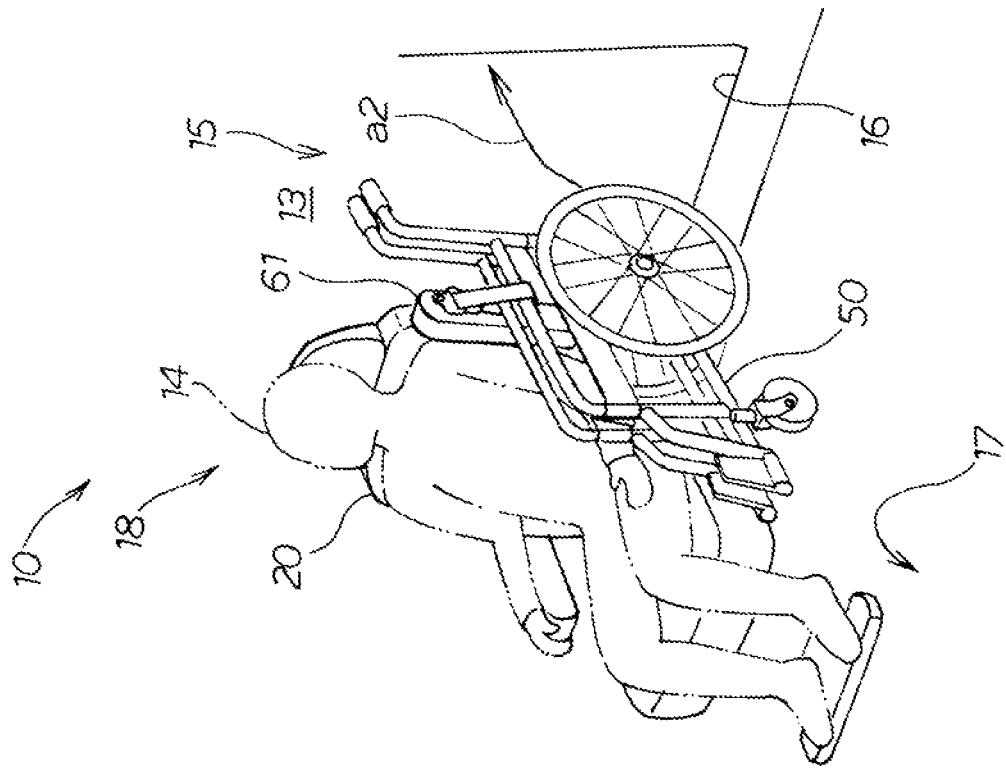
FIGS. 8-9 are drawings for explaining a procedure for raising the seat and the wheelchair illustrated in FIGS. 6-7.

FIG. 9 also illustrates the seat device 18 as part of the process of moving the seat 20 from the loading and unloading position 17 to the seating position 15 in the cabin 13 of the vehicle 10. Following the state of FIG. 8, FIG. 9 illustrates a state in which the wheelchair 50 is raised up higher than the lower edge of the opening 16 as a result of the raising of the left armrest 61. Next, the passenger 14 may operate a switch (e.g., the switch 63 of FIG. 8) to drive a transfer mechanism to draw in the seat 20 (e.g., the transfer mechanism 40 of FIG. 2). The seat 20 moves from the loading and unloading position 17 to inside the cabin 13 of the vehicle, in accordance with the drawing drive of a transfer mechanism as illustrated by arrow a2.

Figures 10, 11, 12:
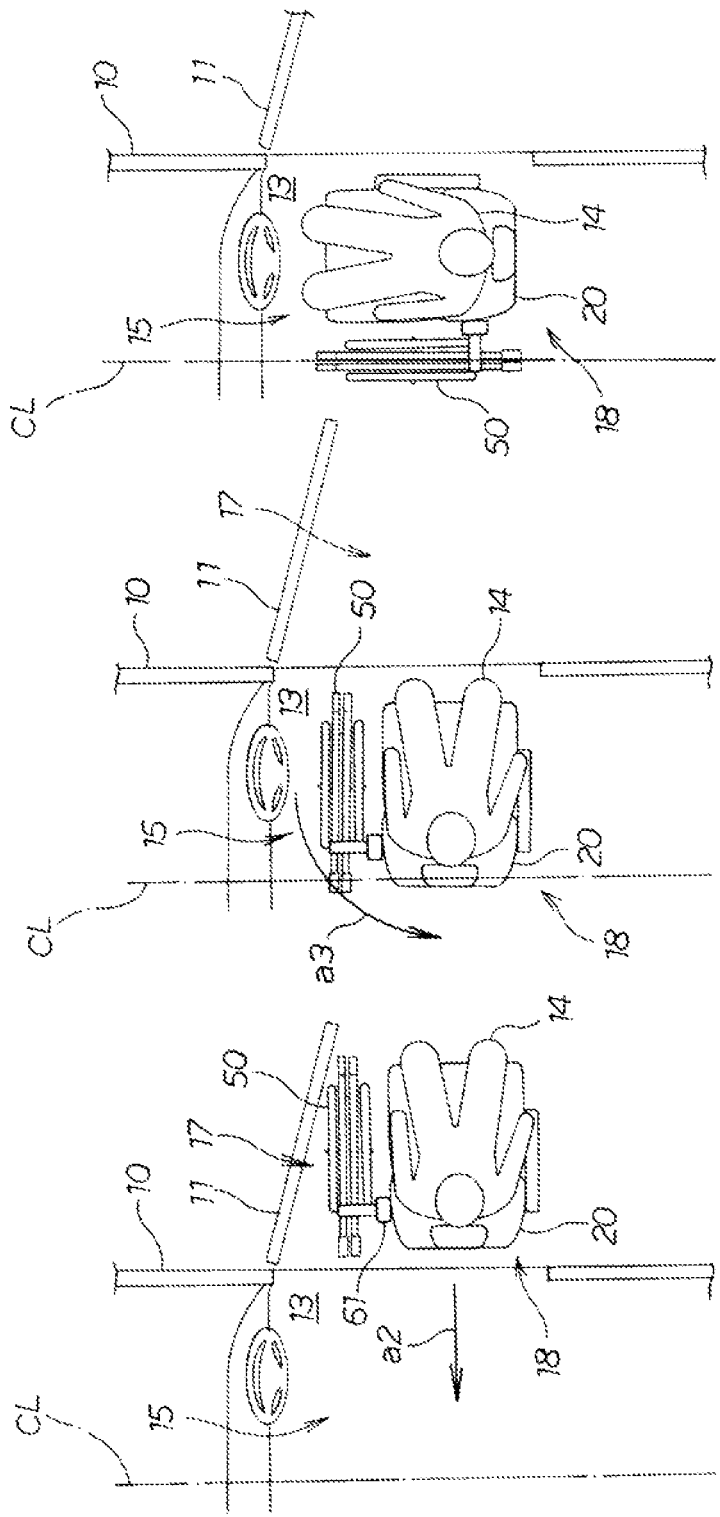
FIGS. 10-12 are drawings for explaining a procedure for moving the wheelchair and the seat illustrated in FIGS. 8-9 from a loading and unloading position to a seating position.

FIG. 10 is an illustration of a plan view corresponding to FIG. 9. The wheelchair 50, together with the seat 20, may move from the loading and unloading position 17 to inside the cabin 13 of the vehicle 10 with the passenger 14 in a seated state in the seat 20, as illustrated by arrow a2. FIG. 10 also includes references to other items shown in other drawings, such as the seating position 15, the loading and unloading position 17, the seat device 18, the door 11, the left armrest 61, and the vehicle width centerline CL.

FIG. 11 illustrates a state in which the seat 20, along with wheelchair 50, is moved to the prescribed seating position 15 in the cabin 13 of the vehicle 10. Next, the passenger 14 may operate a switch (e.g., the switch 63 of FIG. 8) to drive the rotation of a rotation mechanism (e.g., the rotation mechanism 30 of FIG. 2). The seat 20 rotates in a counterclockwise rotation in the drawing as indicated by the arrow a3 in accordance with the rotational drive of a rotation mechanism. FIG. 11 also includes references to other items shown in other drawings, such as the loading and unloading position 17, the seat device 18, the door 11, and the vehicle width centerline CL.

FIG. 12 illustrates a state in which the seat 20 has stopped rotation when the seat 20 is facing in the forward direction of the vehicle 10, in the cabin 13. As a result, the wheelchair 50 is substantially positioned on the vehicle width centerline CL of the vehicle 10. FIG. 12 also includes references to other items shown in other drawings, such as the passenger 14, seating position 15, the seat device 18, and the door 11.

Figure 13:
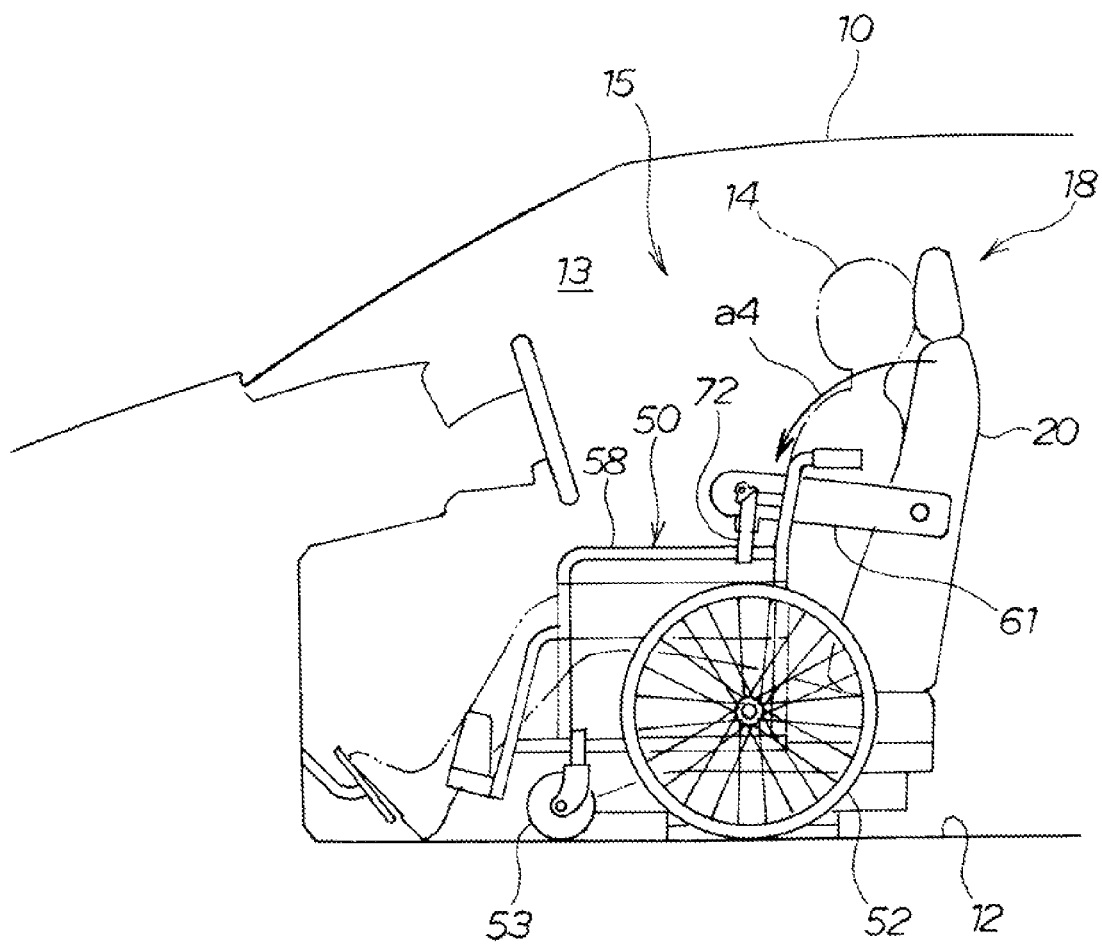
FIG. 13 is a drawing for explaining a state in which the seat and the wheelchair illustrated in FIGS. 10-12 are in a seating position.

FIG. 13 is an illustration of a side view that corresponds to the state illustrated in FIG. 12. Next, the passenger 14 may operate the a switch (e.g., the switch 63 of FIG. 8) to make a motor (e.g., the motor 65 of FIG. 4) undertake a reverse rotation. The left armrest 61 performs a swing movement downward as illustrated by the arrow a4 in accordance with the reverse rotation of a motor. As a result, the wheelchair 50, which is secured to the left armrest 61, is lowered to the floor 12 of the vehicle 10. In this manner, the wheelchair 50 can be lowered to a prescribed position on the floor 12 in the cabin 13, and the wheelchair 50 can be placed in a stable state. Because the wheelchair 50 is placed between the driver seat and the passenger seat, the wheelchair 50 is not in the way and the driver seat, the passenger seat, and the backseat may be more effectively used. FIG. 13 also includes references to other items shown in other drawings, such as the seating position 15, the seat device 18, the front wheel 53 of the wheelchair 50, the rear wheel 52 of the wheelchair 50, the armrest part 58 of the wheelchair 50, and the belt 72 of the left armrest 61 of the seat 20.

The following is a summary of the description of the seat device 18 for use in a vehicle according to the first embodiment. FIGS. 1 to 5 illustrate the securing member 72, provided on the seat 20, which can secure the wheelchair 50 in a folded state to the side surface of the seat 20. Because the belt 72 moves together with the seat 20, the wheelchair 50 can be moved at one time together with the seat 20, where the passenger 14 is seated, from the loading and unloading position 17 to inside the cabin 13, and the time to load the wheelchair 50 and the time to return the seat can be shortened. Further, because the wheelchair 50 in a folded state is brought into the cabin 13 from the opening 16 of the vehicle, the wheelchair 50 is not in the way, which enables the space within the cabin 13 to be used effectively.

In addition, as illustrated in FIG. 3 and FIG. 4, the seat 20 is provided with a raising and a lowering mechanism 61 that can raise and lower the wheelchair 50, in relation to the seat 20, while secured by the securing member 72. Because the wheelchair 50 is raised by the raising and lowering mechanism 61, the wheelchair 50 can be moved to a height that enables the wheelchair to pass through the opening 16 of the vehicle 10. Therefore, the wheelchair 50 can be easily moved into the cabin 13, and moreover, the time to load the wheelchair 50 and the time to return the seat 20 can be shortened.

In addition, as illustrated in FIG. 4, the raising and lowering mechanism 61 is configured by the armrest 61, which is provided so as to be able to swing up and down on the side part of the seat 20. Because the armrest 61 can also be used as the raising and lowering mechanism 61, securing new space for the raising and lowering mechanism 61 is not necessary and the size of the device to load the wheelchair can be reduced. In other words, because the armrest 61 doubles as a mechanism for raising and lowering the wheelchair, less space can be taken up to perform raising and lowering of a wheelchair.

In addition, as illustrated in FIG. 5, the securing member 72 is configured by a belt shaped member (as referred to as a belt). Because the securing member 72 can be rolled up within the seat 20 when the wheelchair 50 is not in use, the securing member 72 might not be in the way.

Figure 14:
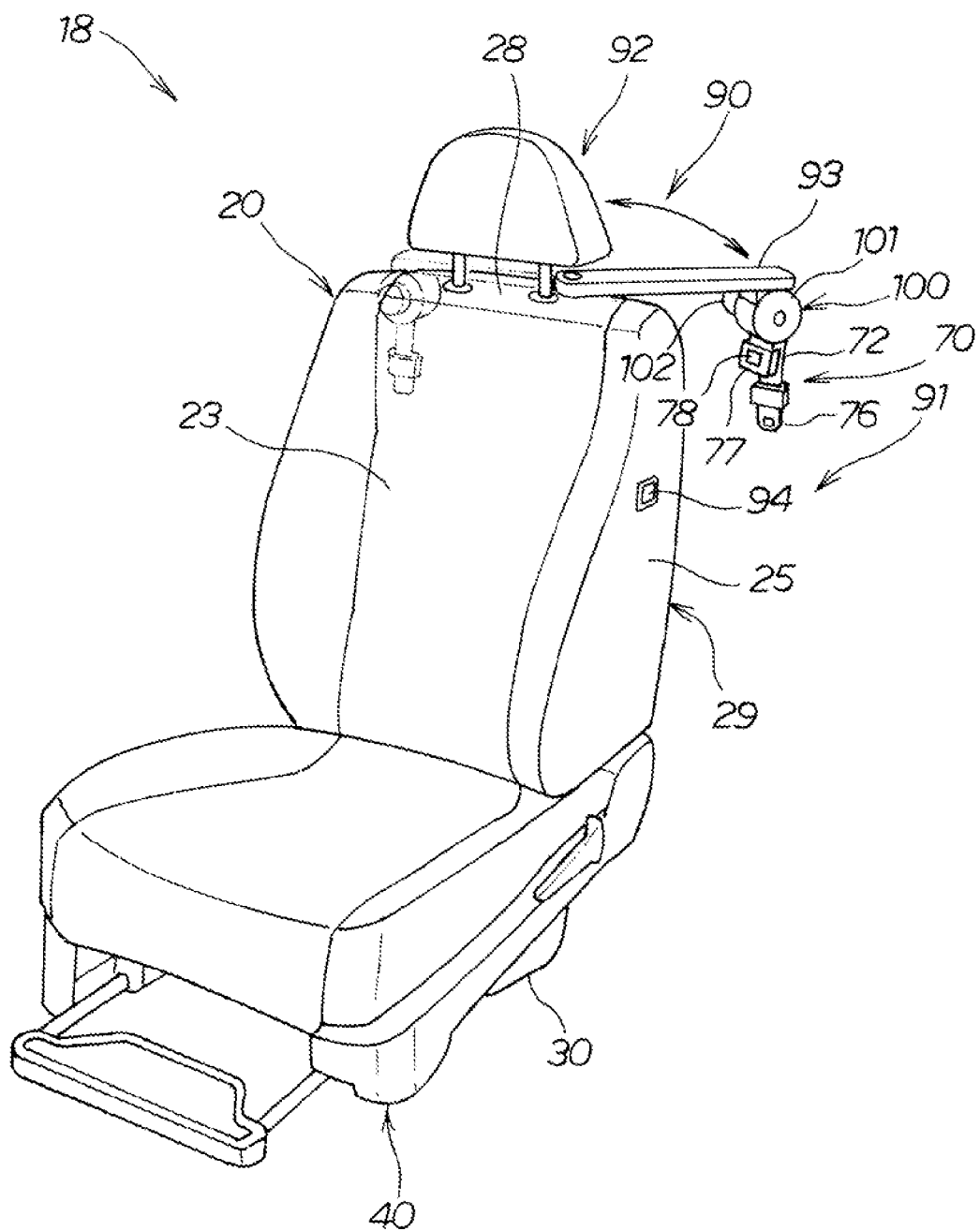
FIG. 14 is a perspective view of a seat device for use in a vehicle according to another embodiment.
Figure 15:
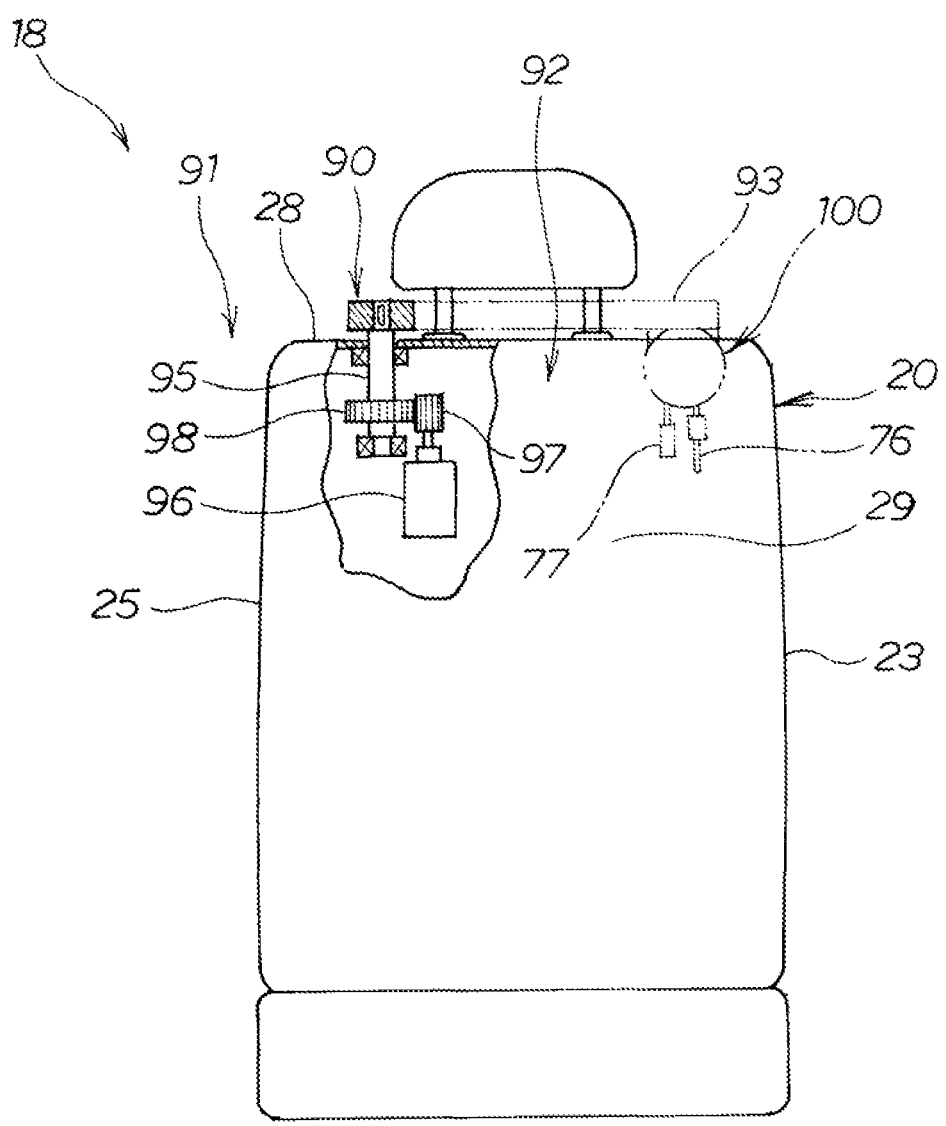
FIG. 15 is a drawing for explaining a displacement mechanism illustrated in FIG. 14.

Next, a description will be given of another embodiment of the present disclosure based on the drawings. Note that similar items to those illustrated in FIG. 3 are given same reference numerals, and the detailed description thereof will be omitted. The configuration of the securing unit 70 of FIG. 14 differs from the securing unit of FIG. 3. The seat 20 of the seat device 18, as illustrated in FIG. 14 and FIG. 15, has a displacement mechanism 90 on a top part 28 of the backrest part 23 for moving the position of a securing member 72. As shown in FIG. 14, the displacement mechanism 90 can move the securing member 72 between a side surface position 91, where a wheelchair in a folded state is placed on the side surface 25 of the seat, and a back surface securing position 92, where the wheelchair is secured to the back surface 29 of the seat 20 from the side surface position 91.

The displacement mechanism 90 has a support bar 93 to support a raising and lowering mechanism 100, and the raising and lowering mechanism 100 is provided on the tip end of the support bar 93. A switch 94 is provided on the side surface 25 of the seat 20, and operating the switch 94 enables the support bar 93 to move as illustrated by the arrow illustrated in FIG. 14.

As shown in FIG. 15, the displacement mechanism 90 includes a support shaft 95 that supports the support bar 93, a displacement motor 96 that outputs driving force for driving the swing action of the support bar 93, a drive gear 97 that transfers the driving force of the displacement motor 96, and a driven gear 98 that meshes with the drive gear 97 to integrally rotate with the support shaft 95. In FIG. 15, the displacement mechanism 90 can move a securing member between a side surface position 91, where a wheelchair in a folded state is placed on the side surface 25 of the seat, and a back surface securing position 92, where the wheelchair is secured to the back surface 29 of the seat 20 from the side surface position 91. When moving the displacement mechanism 90, the support bar 93, lowering mechanism 100, the tongue 76, and the buckle 77 also move.

As shown in FIG. 14, the fixing member 72 that secures the wheelchair may be configured for one-touch mounting in that the tongue 76 provided on the tip end of the pulled out belt 72 may pass through a prescribed portion of the wheelchair and can be attached and released with regard to the buckle 77. When releasing the tongue 76 from the buckle 77, pressing the button 78 of the buckle 77 may enable the release of the tongue 76.

The raising and lowering mechanism 100 includes a retractor 101 that rolls up the belt 72, a belt reel (not illustrated) that rolls up the belt 72 provided within the retractor 101, and a motor 102 that rotationally drives the belt reel. The retractor 101 has a mechanism, namely an electronic pretensioner, to rapidly roll up the loose portion of the belt 72 by the rotational drive of the belt reel by the motor 102 in accordance with the attached state of the wheelchair. In addition, further rolling up of the belt 72 enables the wheelchair to be raised.

Figures 16, 17:
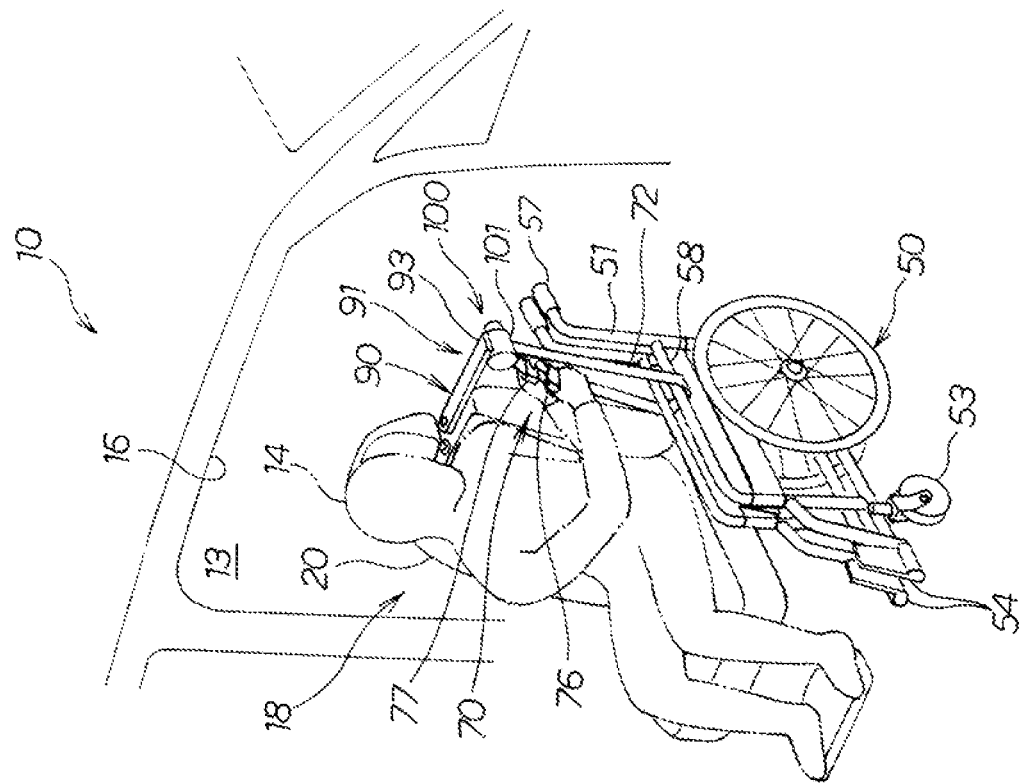
FIGS. 16-17 are drawings for explaining a procedure for securing the wheelchair to the securing member illustrated in FIG. 14.

The following is an explanation of the effect of the seat device for use in a vehicle according to the second embodiment described above. First, a description will be given of the procedure for the passenger 14 sitting in the wheelchair 50 to get into the vehicle 10, starting with FIGS. 16-19. FIGS. 16-19 illustrate a seat device 18 positioned with the seat 20 in a loading and unloading position 17 rather than in the cabin 13. To get to this position, the seat 20 can pass through the opening 16 of the vehicle 10. FIG. 16 illustrates a state in which the seat 20 is moved from a seating position in the cabin 13 to the loading and unloading position 17. The seat 20 positioned in a prescribed loading and unloading position 17 is facing outside in the vehicle width direction in relation to the vehicle 10. The passenger 14 sitting in the wheelchair 50, when getting into the vehicle 10, first, aligns the wheelchair 50 next to the seat 20 and transitions from the wheelchair 50 to the seat 20. After the passenger 14 has transitioned to the seat 20, the wheelchair 50 is folded up. In addition, the passenger 14 operates a switch (e.g., the switch 94 of FIG. 14) to make a motor (e.g., the displacement motor 96 of FIG. 15) undertake a normal rotation. The support bar 93 moves as indicated by the arrow a5 in accordance with the positive rotation of the motor.

As illustrated in FIGS. 16-17, the wheelchair 50 is not a specialized wheelchair that can only be loaded into a specific type of vehicle but is a general wheelchair 50 that can be folded. Wheelchair 50 is a model that can be folded in the width direction and includes a frame part 51 which is a base, left and right rear wheels 52 that can be turned by hand, left and right front wheels 53 (casters) that can swivel, a foot rest part 54 where the feet of the passenger 14 can be placed, a seat surface 55 (shown in FIG. 16 but not FIG. 17, where seat surface 55 is collapsed) where the passenger 14 can sit and that can be folded, a backrest 56 (shown in FIG. 16 but not FIG. 17, where back rest 56 is collapsed) which the passenger 14 can lean back against and that can be folded, operation handles 57 to be used when the wheelchair 50 is pushed, and left and right armrest parts 58 integrally provided with the frame part 51.

FIG. 17 illustrates a state in which the passenger 14, having transitioned to the seat 20, has completed folding the wheelchair 50. Next, the passenger 14 can pull out the belt 72 from the raising and lowering mechanism 100 and pass the belt through the lower part of the armrest part 58 of the wheelchair 50 and lock it by inserting the tongue 76 into the buckle 77. As a result, the wheelchair 50 is secured to the raising and lowering mechanism 100 by the belt 72. In other words, the wheelchair 50 in a folded state is secured to the side surface position 91 of the seat 20 by the belt 72. The seat device 18 includes a displacement mechanism 90, as discussed above. The displacement mechanism 90 has a support bar 93 to support a raising and lowering mechanism 100, and the raising and lowering mechanism 100 is provided on the tip end of the support bar 93. The raising and lowering mechanism 100 includes a retractor 101 that rolls up the belt 72 of the securing unit 70.

Figure 18:
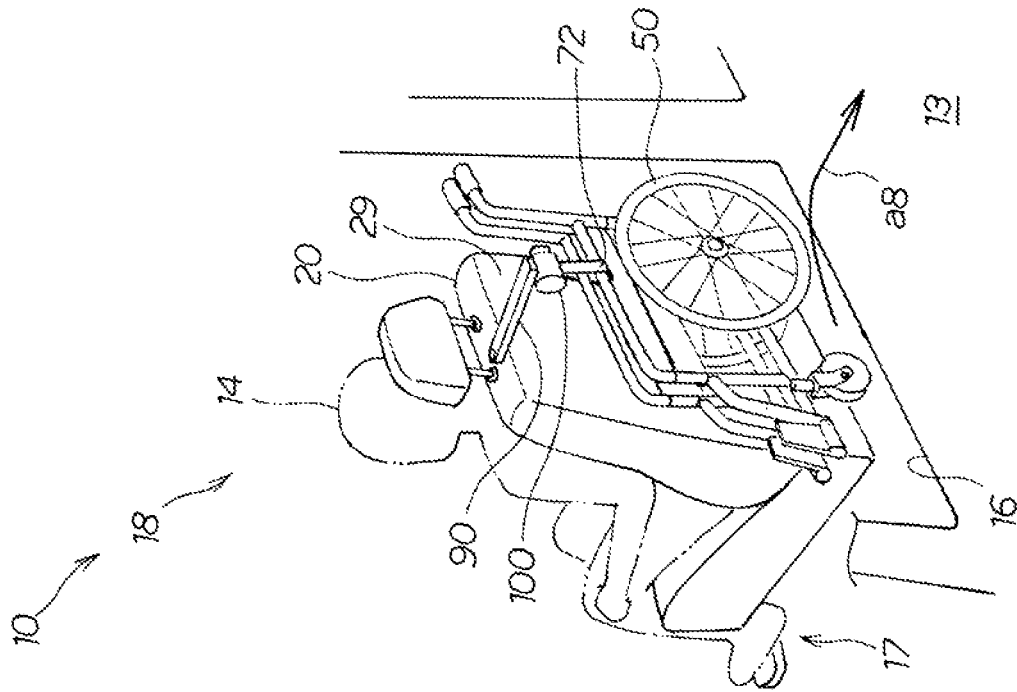
FIGS. 18-19 are drawings for explaining a procedure for securing the wheelchair illustrated in FIGS. 16-17 to the back surface of the seat.

FIG. 18 illustrates a state in which the wheelchair 50 is secured to the raising and lowering mechanism 100 by the belt 72. Next, the passenger 14 can operate the switch 94 to make the motor 102 undertake a normal rotation. In such a rotation, the belt 72 rolls up in an upward direction as illustrated by the arrow a6 in accordance with the normal rotation of the motor 102. As result, the wheelchair 50, which is secured to the raising and lowering mechanism 100, is raised up higher than the bottom edge of the opening 16 of the vehicle 10.

In addition, the passenger can operate the switch 94 to make a displacement motor, such as the displacement motor 96 of FIG. 15, undertake a reverse rotation. Operating the displacement motor in a reverse rotation moves the displacement mechanism 90 as illustrated by the arrow a7 so that the wheelchair 50 is moved from the side surface position 91 to the back surface securing position 92 so as to secure the wheelchair 50 on the back surface 29 of the seat 20.

Figure 19:
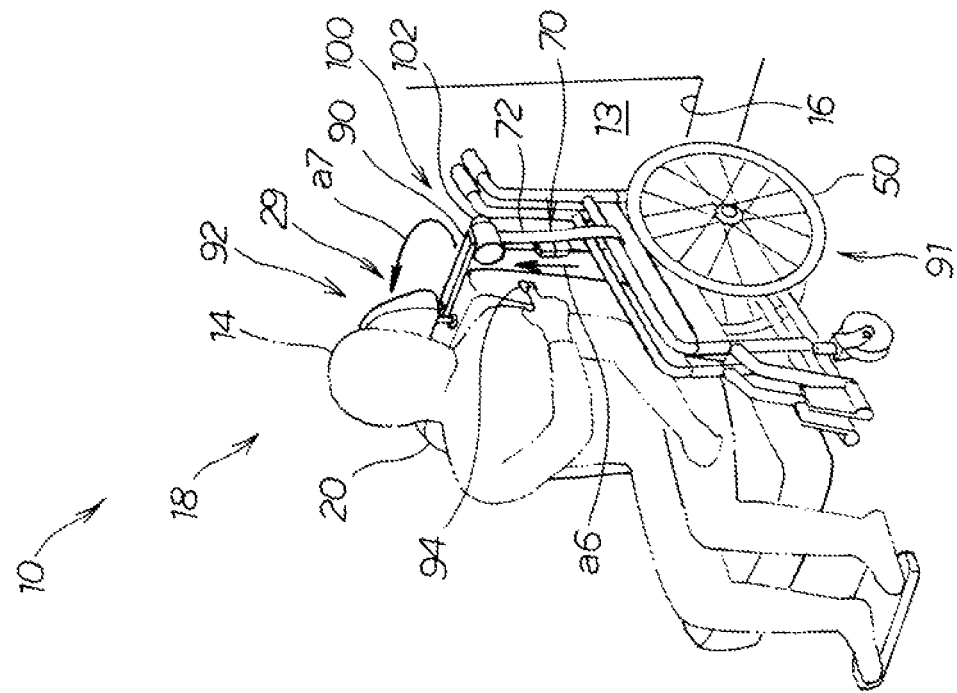

FIG. 19 illustrates a state in which the wheelchair 50 is raised up higher than the lower edge of the opening 16. Next, the passenger 14 can operate a switch, such as the switch 94 of FIG. 14, to drive a transfer mechanism, such as the transfer mechanism 40 of FIG. 2 or FIG. 14, to draw in the seat 20. The seat 20 can move from the loading and unloading position 17 to inside the cabin 13 in accordance with the drawing drive of the transfer mechanism as illustrated by arrow a8. FIG. 19 also includes references to other items shown in other drawings, such as the displacement mechanism 90, the raising and lowering mechanism 100, and the belt 72.

Figure 20:
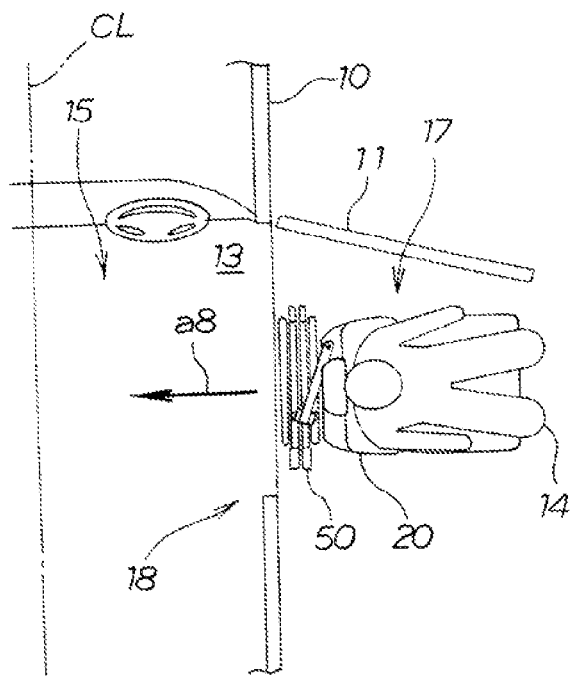
FIGS. 20-23 are drawings for explaining a procedure for moving the seat and wheelchair illustrated in FIGS. 18-19 from a loading and unloading position to a seating position.

FIG. 20 is an illustration of a plan view corresponding to FIG. 19. The wheelchair 50, together with the seat 20, may move from the loading and unloading position 17 to inside the cabin 13 with the passenger 14 in a seated state in the seat 20 in accordance with the arrow a8.

Figure 21:
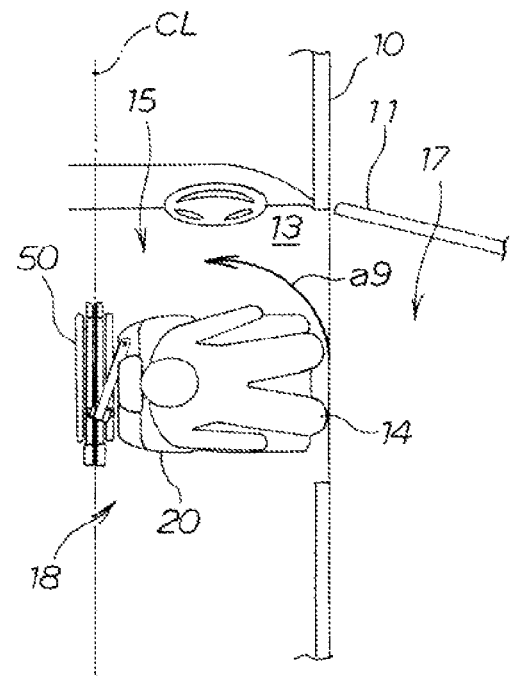

FIG. 21 illustrates a state in which the seat 20 is moved to the prescribed seating position 15. Next, the passenger 14 can operate a switch, such as the switch 94 of FIG. 14, to drive the rotation of a rotation mechanism, such as the rotation mechanism 30 of FIG. 2 and FIG. 14. The seat 20 can rotate in a counterclockwise rotation in the drawing as indicated by the arrow a9 in accordance with the rotational drive of the rotation mechanism.

Figure 22:
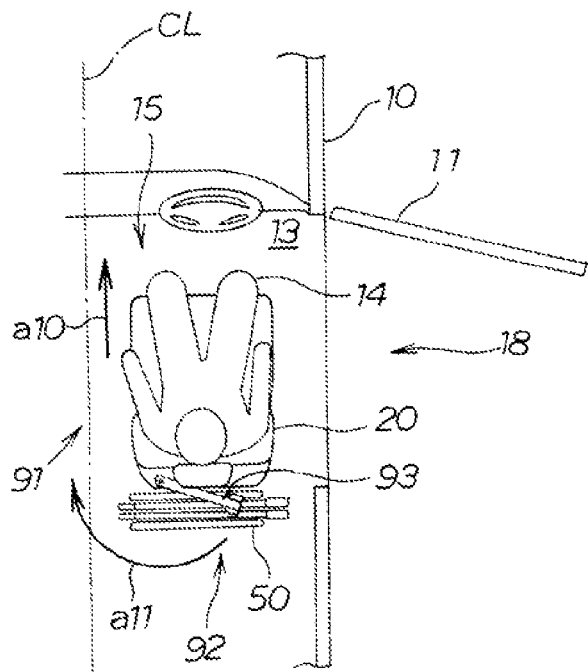

FIG. 22 illustrates a state in which the seat 20 is facing in the forward direction. Next, the passenger 14 can operate a switch, such as the switch 94 of FIG. 14, to drive a transfer mechanism, such as the transfer mechanism 40 of FIG. 2 and FIG. 14, to advance the seat 20. The position of the seat may be adjusted to move as illustrated by the arrow a10 in accordance with the advancing drive of the transfer mechanism. In addition, the passenger 14 can operate a switch, such as the switch 94 of FIG. 14, to make a displacement motor, such as the displacement motor 96 of FIG. 15, undertake a normal rotation. As a result, the support bar 93 can move in accordance with the positive rotation of the displacement motor to move the wheelchair 50 as illustrated by arrow a11 such that the wheelchair 50 moves from a back surface securing position 92 to a side surface position 91.

Figure 23:
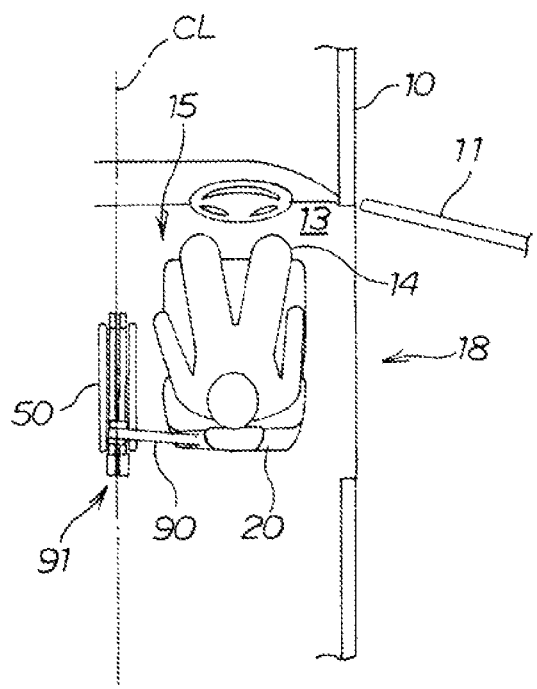

FIG. 23 illustrates a state in which the displacement mechanism 90 has stopped rotation when the seat 20 is facing in the forward direction of the vehicle and the wheelchair 50 is in the side surface position 91. In this position, the wheelchair 50 may be substantially positioned on the vehicle width centerline CL of the vehicle 10 as a result of rotating along line a11 shown in FIG. 22.

Figure 24:
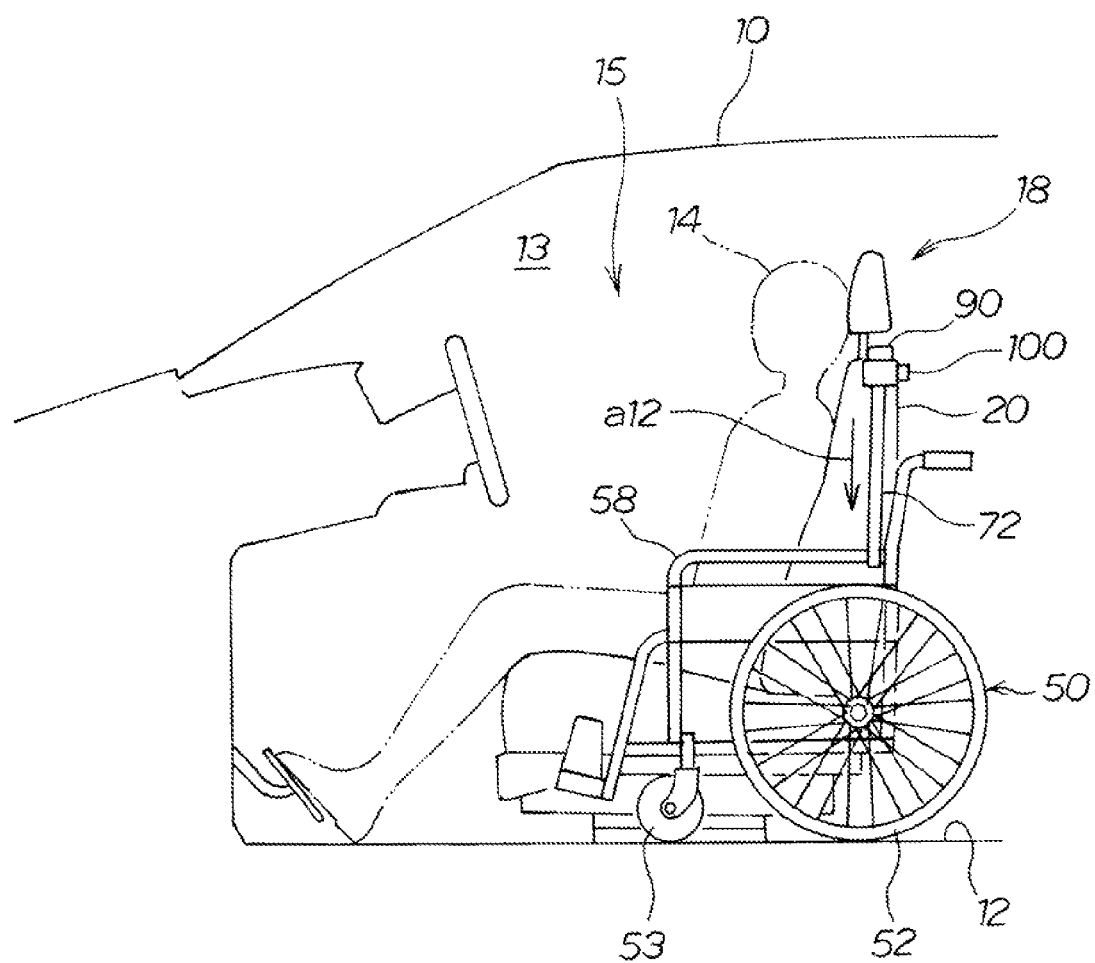
FIG. 24 is a drawing for explaining a state in which the seat and the wheelchair illustrated in FIGS. 20-23 are in a seating position.

FIG. 24 is an illustration of a side view that corresponds to the state illustrated in FIG. 23. Next, the passenger 14 can operate a switch, such as the switch 94 of FIG. 14, to make a motor, such as the motor 102 of FIG. 14, undertake a reverse rotation. In response, the belt 72 may generate slack downward as illustrated by the arrow a12 in accordance with the reverse rotation of the motor. As a result, the wheelchair 50 may be lowered to the floor 12. In this manner, the wheelchair 50 can be lowered to a prescribed position on the floor 12 in the cabin 13, and the wheelchair 50 can be placed in a stable state. Because the wheelchair 50 is placed between the driver seat and the passenger seat, the wheelchair 50 might not be in the way and the driver seat, the passenger seat, and the backseat may be more effectively used. FIG. 24 also includes references to other items shown in other drawings, such as armrest parts 58, front wheels 52, and rear wheels 52 of wheelchair 50; displacement mechanism 90; and the raising and lowering mechanism 100.

According to the configuration illustrated in FIGS. 10 to 24 described above, the wheelchair 50 may be secured to the back surface 29 of the seat 20 of seat device 18 when moving the seat 20 between the loading and unloading position 17 and the seating position 15. When doing so in this manner, the size of the width of the seat 20 along with the wheelchair 50 may be suppressed from expanding compared to when the wheelchair 50 is secured to the side surface of the seat 20. Therefore, the seat 20 having the wheelchair 50 secured thereto may be more easily taken out of and put into the cabin 13 from an opening 16 of the vehicle 10 when the door 11 is open. Further, after setting the seat 20 in the seating position 15, the wheelchair 50 can be moved from the back to the side surface position to enable the space behind the seat 20 to be better available for utilization.

Note that in the embodiments, the raising and lowering mechanisms 60 and 100 were configured as described above, however, alternate configurations of the raising and lowering mechanisms 60 and 100 are possible. For example, alternative mechanisms can raise and lower the wheelchair 50 that is secured by the securing member 72 in relation to the seat 20. In the embodiments, the wheelchair 50 is arranged so as to be substantially positioned along centerline CL of the vehicle 10 when the seat 20 is in the seating position, but the wheelchair 50 can also be arranged to be on an outer side in the vehicle width direction of the seat 20. Further, with the second embodiment, the wheelchair 50 was moved from the back to the side surface position, but the wheelchair 50 may also remain secured to the back surface of the seat 20. With the embodiments, the fixing member is a member in a state that can be rolled up into the seat, but alternate configurations are also possible. Note that it might be desirable that a device to secure the wheelchair 50 to the floor of the vehicle cabin be provided when the seat 20 is in the seating position.

The seat device for use in a vehicle of the present disclosure may be used as a seat device for use in a vehicle that enables a person sitting in a wheelchair to get in and out of a vehicle and to loading a wheelchair into a vehicle. The present disclosure is not limited to the above embodiments and various configurations may be realized on the basis of the content of description in this specification. For example, while the vehicle illustrated may have been an automobile, such as a sedan or mini-van, other vehicles, such as neighborhood electric vehicles, golf carts, or all-terrain vehicles, such as multi-purpose utility vehicles, may be used with the disclosure. As another example, while the disclosure only has embodiments with right-hand drive configured vehicles, embodiments may exist with left-hand drive or center drive (e.g., a one-seat configuration in a first row).

What is claimed is:

1. A seat device comprising:
a securing member attached directly to a vehicle seat to secure a wheelchair in a folded state to a side surface or a back surface of the vehicle seat such that the wheelchair together with the vehicle seat can move from a loading and unloading position to a cabin of a vehicle with a passenger in a seated position.

2. The seat device according to claim 1, wherein the loading and unloading position is a position where the passenger can load and unload as well as be seated, and the seated position is a position where the passenger can maintain a seated disposition.

3. The seat device according to claim 1, wherein the vehicle seat comprises a raising and lowering mechanism that can raise and lower, in relation to the vehicle seat, the wheelchair secured by the securing member.

4. The seat device according to claim 3, wherein the raising and lowering mechanism comprises an armrest that can swing up and down, provided on a side part of the vehicle seat.

5. The seat device according to claim 1, further comprising, in a configuration that secures the wheelchair to the back surface of the vehicle seat, a displacement mechanism to move the securing member between a side surface position, where the wheelchair in the folded state is arranged on the side surface of the vehicle seat, and a back surface securing position, where the wheelchair from the side surface position is secured to the back surface of the vehicle seat.

6. The seat device according to claim 1, wherein the securing member comprises a belt shaped member that can roll up in an inner part of the vehicle seat.

7. The seat device according to claim 1, wherein the seat device comprises a driver's seat for an automobile.

8. The seat device according to claim 1, wherein the securing member comprises a belt with a ratchet to regulate a belt reel.

9. A method comprising:
positioning a vehicle seat outside of a vehicle associated with the vehicle seat;
connecting a wheelchair to the vehicle seat using a securing device of the vehicle seat, the securing device attached directly to the vehicle seat to secure the wheelchair to the vehicle seat; and
positioning the vehicle seat to a seating position for a passenger, where the seating position is a position for movement of a passenger along with the vehicle while the vehicle is in motion and where the positioning involves the device moving the wheelchair with the vehicle chair and the positioning results in the wheelchair being stowed in the vehicle cabin.

10. The method according to claim 9, wherein the position of a vehicle seat outside of the vehicle results in the vehicle seat being in a loading and unloading position where the passenger can load and unload as well as be seated, and the seating position is a position where the passenger can maintain a seated disposition.

11. The method according to claim 9, wherein the vehicle seat comprises a raising and lowering mechanism that can raise and lower, in relation to the vehicle seat, the wheelchair secured by the securing device.

12. The method according to claim 11, wherein the raising and lowering mechanism comprises an armrest that can swing up and down, provided on a side part of the vehicle seat.

13. The method according to claim 9, wherein the vehicle seat further comprises a displacement mechanism to move the securing member device a side surface position, where the wheelchair in a folded state is arranged on the side surface of the vehicle seat, and a back surface securing position, where the wheelchair from the side surface position is secured to the back surface of the vehicle seat.

14. The method according to claim 9, wherein the securing device comprises a belt shaped member that can roll up in an inner part of the vehicle seat.

15. The method according to claim 9, wherein the vehicle seat comprises a driver's seat for an automobile.

16. A vehicle comprising:
a seat device comprising:
a securing member attached directly to a vehicle seat to secure a wheelchair in a folded state to a side surface or a back surface of the vehicle seat such that the wheelchair together with the vehicle seat can move from a loading and unloading position to a cabin of the vehicle with a passenger in a seated position.

17. The vehicle according to claim 16, wherein the loading and unloading position is a position where the passenger can load and unload as well as be seated, and the seated position is a position where the passenger can maintain a seated disposition.

18. The vehicle according to claim 16, wherein the vehicle seat comprises a raising and lowering mechanism that can raise and lower, in relation to the vehicle seat, the wheelchair secured by the securing member.

19. The vehicle according to claim 18, wherein the raising and lowering mechanism comprises an armrest that can swing up and down, provided on a side part of the vehicle seat.

20. The vehicle according to claim 16, wherein the vehicle is an automobile.

\* \* \* \* \*